Feb. 25, 1969  L. GAMELCY ET AL  3,428,975
SPRING SEAT CONSTRUCTION
Filed May 15, 1967
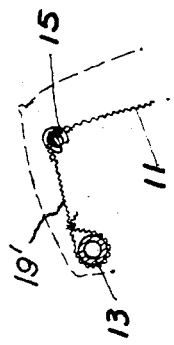
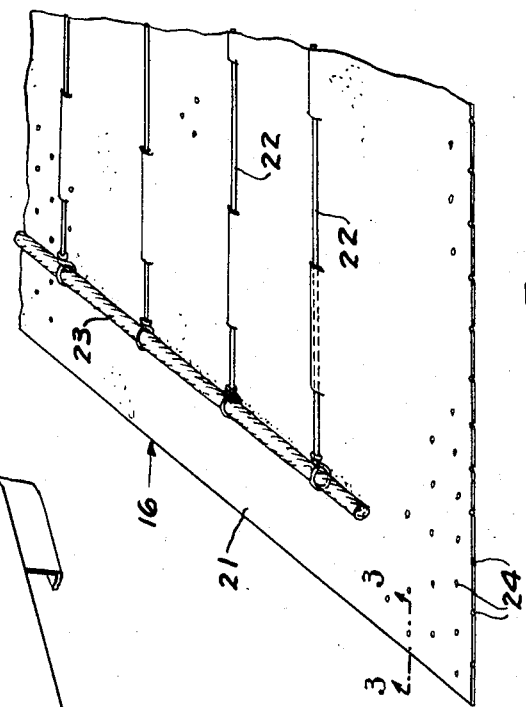
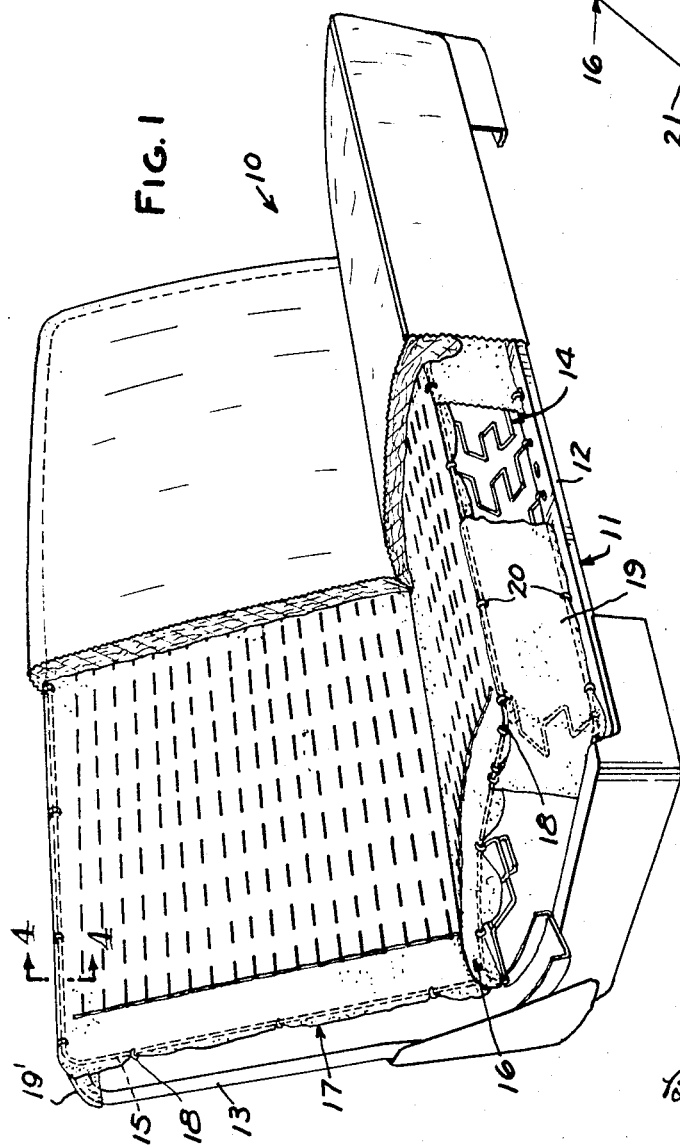
INVENTORS
LIONEL GAMELCY
& HENRY J. TISCHLER
BY
ATTORNEYS United States Patent Office 3,428,975
Patented Feb. 25, 1969

3,428,975
SPRING SEAT CONSTRUCTION
Lionel Gamelcy, Detroit, and Henry J. Tischler, Bloomfield Hills, Mich., assignors to Young Spring & Wire Corporation, Detroit, Mich., a corporation of Delaware
Filed May 15, 1967, Ser. No. 638,443
U.S. Cl. 5—354                        10 Claims
Int. Cl. A47c 23/00, 7/02

ABSTRACT OF THE DISCLOSURE

The spring seat construction disclosed herein comprises a seat frame having one or more spring assemblies mounted therein, insulator pads on said spring assemblies and upholstery in the form of padding on said pads. The insulator pads are made of a coherent, flexible, nonwoven, fibrous sheet of synthetic organic polymers which is made by contact bonding without the use of adhesive bonding agents and has a high strength in the dry and wet state and is isotropic. A plurality of wire elements are threaded through the insulator pad and a cord made of a twisted sheet of the same material as the sheet in the pad is fastened to the ends of the wire elements. A listing sheet and a skirt sheet of similar sheet material are fastened and extend from the edge of the spring assembly to the frame.

This invention relates to spring seats such as used in automobiles and furniture.

Background of the invention

In the manufacture of spring seats for automobiles and furniture, it is conventional to provide a spring assembly on which an insulator pad is positioned in underlying relation to the appropriate padding to distribute the load and prevent the padding from moving downwardly between the springs of the spring assembly. Conventionally the insulator pad comprises a sheet of burlap or extruded plastic which has a plurality of wire elements threaded therethrough. The use of either burlap or extruded plastic is costly. Further, burlap is subject to deterioration due to moisture and mildew. Extruded plastic is easily torn and therefore makes it difficult to fasten to the wire of the spring assembly.

Among the objects of the present invention are to provide a spring seat construction which incorporates an insulator pad of novel construction that is low in cost, has high strength, is not subject to rot and mildew and has better wearability than burlap or extruded plastic.

Summary

The invention disclosed herein comprises a spring seat construction having a seat frame having one or more spring assemblies mounted therein, insulator pads on said spring assemblies and upholstery in the form of padding on said pads. The insulator pads are made of a coherent, flexible, nonwoven, fibrous sheet of synthetic organic polymers which is made by contact bonding without the use of adhesive bonding agents and has a high strength in the dry and wet state and is isotropic. A plurality of wire elements are threaded through the insulator pad and a cord made of a twisted sheet of the same material as the sheet in the pad is fastened to the ends of the wire elements. A listing sheet and a skirt sheet of similar sheet material are fastened and extend from the edge of the spring assembly to the frame.

Description of the drawings

FIG. 1 is a part sectional perspective view of a seat embodying the invention.

FIG. 2 is a fragmentary perspective view of an insulator pad utilized in the seat shown in FIG. 1.

FIG. 3 is a partly diagrammatic fragmentary sectional view on an enlarged scale taken along the line 3—3 in FIG. 2.

FIG. 4 is a fragmentary sectional view taken along the line 4—4 in FIG. 1.

Description

Referring to FIG. 1, seat 10 comprises a frame 11 that has a seat base portion 12 and a seat back portion 13. A spring assembly 14 is provided on the seat base portion 12 and a spring assembly 15 is provided on the seat back portion 13. The spring assemblies 14, 15 may comprise a plurality of springs herein shown as sinuous spring elements that provide a platform that is spaced from the respective seat base and seat back portions 12, 13. Insulator pads 16, 17 are provided on the spring assemblies 14, 15 and are fastened by hog rings 18 to the border wires of the spring assemblies. A skirt sheet 19 extends downwardly from the forward edge of the spring assembly 14 and is fastened by hog rings 20 to the spring assembly and the seat base portion 12, respectively. Similarly a listing sheet 19' is fastened by hog rings to the top edge of the spring assembly 15 and looped over the frame and fastened to itself (FIG. 4).

Referring to FIGS. 2 and 3, each of the insulator pads 16, 17 is made of a sheet of synthetic organic polymer material which is made by contact bonding without the use of adhesive bonding agents to produce a coherent, flexible, nonwoven, fibrous sheet which is isotropic, that is, has equal strength and properties in all directions, which has high strength in both the dry and wet state, and which is not subject to rot and mildew, and which is relatively stable at the temperatures to which the seat might be subjected.

A satisfactory material comprises the spunbonded olefin manufactured by E. I. du Pont de Nemours & Company, Inc., of Wilmington, Del., and sold under the trademark "Tyvek." Such a material is disclosed in the patent to Steuber, 3,169,899. A satisfactory material has the following properties:

Basic weight _____ 1.25 ounces/square yard.
Nominal weight _____ 5 mils.
Grab tear strength _____ 36/21 lbs.
Strip tensile strength ____ 15/10 lb./inch.
Elongation to break _____ 22/27%.
MIT flex _____ Greater than 100,000 cycles.
Tongue tear _____ 3.3/3.0 lbs.
Mullen burst _____ 91%.
Bausch and Lomb opacity 89%.
Contact covering power _ 63 lbs./in.$^2$.

As further shown in FIG. 2, a plurality of wire elements 22 are threaded through the sheet 21. The wire elements 22 may comprise metal or plastic. A cord 23 is provided adjacent the ends of the wire elements 22 and the ends are twisted over the cord 23. The cord 23 is preferably made of a twisted sheet of material which is identical to the material of which the sheet 21 is made. As shown in FIG. 2, the sheet 21 can be provided with a plurality of spaced openings 24 to provide free passage of air and circulation of air through the seat. The skirt sheet 19 and listing sheet 19' (FIG. 1) is also preferably made of the same material as the sheet 21.

The use of aforementioned material to make the sheet 21 provides for substantial saving in cost over a woven burlap or an extruded plastic sheet. Moreover, since the sheet is not subject to rot or mildew, the disadvantages of burlap are thereby overcome. Further, since the sheet has substantial strength, it is not weakened by piercing due to threading of the wires 22 therethrough or the piercing by the hog rings 18. Similarly, the use of the aforementioned material for the skirt sheet 19 and listing sheet 19' provides for stability as well as the strength so that the piercing by the hog rings will minimize the tendency to tear the material.

I claim:
1. The combination comprising:
    a seat frame,
    a spring assembly on said seat frame,
    an insulator pad on said spring assembly,
    said insulator pad comprising a coherent, flexible, nonwoven, fibrous sheet of synthetic organic polymer,
    said sheet having a high strength in the dry and wet state and being formed by contact bonding without the use of adhesive bonding agents,
    said sheet being substantially isotropic,
    and a plurality of wire elements threaded through said sheet,
    a cord extending between and connected to the ends of said wire elements,
    and upholstery padding over said insulator pad.
2. The combination set forth in claim 1 including means for fastening said pad to said spring assembly comprising a plurality of hog rings piercing said sheet and connected to said spring assembly.
3. The combination set forth in claim 1 wherein said spring assembly has an edge spaced from the frame,
    and a listing sheet extending downwardly from the edge toward the frame,
    said listing sheet being made of the same material as said insulator pad sheet,
    and means fastening said listing sheet to said spring assembly.
4. The combination set forth in claim 3 wherein said means fastening said sheet to said spring assembly comprises a plurality of hog rings.
5. The combination set forth in claim 1 including a spring assembly defining a seat back,
    and an insulator pad on said spring assembly,
    said insulator pad being made of a similar sheet material as said first-mentioned insulator pad and having a plurality of wire elements threaded therethrough and a cord joining the ends of said elements,
    and means for fastening said last-mentioned insulator pad to said second spring assembly.
6. The combination set forth in claim 5 wherein said cords are made of twisted sheet material of substantially the same construction and composition as said sheet in said insulator pad.
7. An insulator pad comprising:
    a coherent, flexible, nonwoven, fibrous sheet of synthetic organic polymers,
    said sheet being made by contact bonding without the use of adhesive bonding agents,
    said sheet having high strength in the dry and wet state and being isotropic,
    a plurality of substantially parallel spaced wire elements threaded through said sheet,
    a cord adjacent the ends of said elements and fastened thereto.
8. The combination set forth in claim 7 wherein said sheet is made of linear polyethylene.
9. The combination set forth in claim 7 wherein said cord comprises a twisted sheet of substantially the same material as the sheet of said insulator pad.
10. The combination set forth in claim 7 wherein said sheet has a thickness of approximately 4 mils and a weight of approximately 1.3 ounces per square yard.

References Cited

UNITED STATES PATENTS

| 3,070,814 | 1/1963 | Withoff | 5—354 |
| 3,081,130 | 3/1963 | Wieland | 297—455 |
| 3,169,899 | 2/1965 | Steuber | 161—72 |
| 3,273,179 | 9/1966 | Ridenour | 5—354 |
| 3,315,283 | 4/1967 | Larsen | 5—354 |
| 3,317,935 | 5/1967 | Berger | 5—354 |

CASMIR A. NUNBERG, *Primary Examiner.*

U.S. Cl. X.R.

297—455